United States Patent [19]
Barron

[11] B 3,993,576
[45] Nov. 23, 1976

[54] MIXTURES OF HIGH AND LOW MOLECULAR WEIGHT POLYOLS RESISTANT TO PHASE SEPARATION

[75] Inventor: Benny Gene Barron, Lake Jackson, Tex.

[73] Assignee: The Dow Chemical Company, Midland, Mich.

[22] Filed: May 20, 1974

[21] Appl. No.: 471,405

[44] Published under the second Trial Voluntary Protest Program on February 10, 1976 as document No. B 471,405.

[52] U.S. Cl. .................. 252/182; 260/2.5 AM; 260/2.5 AP; 260/77.5 AM; 260/77.5 AP
[51] Int. Cl.² ................................ C08G 18/65
[58] Field of Search ............ 252/182; 260/2.5 AP, 260/2.5 AM, 77.5 AP, 77.5 AM

[56] References Cited
UNITED STATES PATENTS 3,630,973   12/1971   Ardis et al. ............... 260/2.5 AM X Primary Examiner—Richard D. Lovering
Assistant Examiner—David Leland
Attorney, Agent, or Firm—James G. Carter

[57] ABSTRACT

Mixtures of high molecular weight polyols and low molecular weight polyols such as mixtures of glycerine initiated polyoxypropylene glycols and mono- and diethylene glycols are solubilized and therefore rendered resistant to phase separation upon storage by the addition thereto of an effective quantity of a derivative of butylene glycol or propylene glycol such as dibutylene glycol.

13 Claims, No Drawings

MIXTURES OF HIGH AND LOW MOLECULAR WEIGHT POLYOLS RESISTANT TO PHASE SEPARATION

The present invention relates to soluble mixtures of low molecular weight polyols and high molecular weight polyols.

Mixtures of low molecular weight polyols and high molecular weight polyols are used in the preparation of polyurethane foams and elastomers as taught in U.S. Pat. No. 3,725,355 and application Ser. No. 361,689, filed May 18, 1973, now U.S. Pat. No. 3,821,130.

It has been discovered that certain mixtures of these low molecular weight polyols and high molecular weight polyols, particularly low molecular weight diols and high molecular weight triols are insoluble, i.e. they tend to separate into two distinct phases during prolonged storage and or shipment.

It has unexpectedly been discovered that the addition of propylene glycol derivatives and/or butylene glycol derivatives solubilizes these mixtures thereby reducing or eliminating the tendency of such mixtures to phase separation.

The present invention therefore concerns a composition resistant to phase separation which comprises:

A. an insoluble mixture which is susceptible to phase separation which comprises:
1. from about 95% to about 50%, preferably from about 91% to about 74% and most preferably from about 85% to about 78%, by weight of a relatively high molecular weight polyol having an average of from about 2 to about 4 OH groups per molecule and an average OH equivalent weight of from about 650 to about 3000, preferably from about 1000 to about 2000, or mixtures thereof, and
2. from about 5% to about 50%, preferably from about 9% to about 26% and most preferably from about 16% to about 22%, by weight of a relatively low molecular weight polyol selected from the group consisting of ethylene glycol, diethylene glycol, tetraethylene glycol, liquid polyoxyethylene glycols, 1,4-butane diol, glycerine and mixtures thereof; and B. as a solubilizer for Component A, a minor but effective quantity of a compound or mixture of compounds represented by the formulas I. 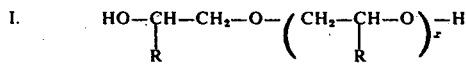

wherein R is methyl or ethyl and x has a value from 0 to about 3 with the proviso that when x is O, R is ethyl;

II. 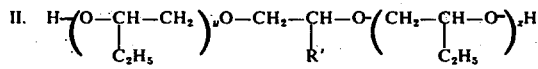

wherein R' is hydrogen or methyl, y and z independently have a value from zero to about 2 with the proviso that at least one of y or z must have a value of at least 1.

Suitable low molecular weight polyols which are incompatible with high molecular weight polyols and which are employed in the present invention include, for example, diethylene glycol, ethylene glycol, triethylene glycol, tetraethylene glycol, all liquid polyoxyethylene glycols, glycerine, 1,4-butane diol, mixtures thereof and the like.

Suitable high molecular weight polyols which are employed in the present invention include, for example, polyether polyols such as polyoxyalkylene glycols wherein the majority of the oxyalkylene groups are other than oxyethylene groups and have from about 2 to about 4 hydroxyl groups per molecule and hydroxyl equivalent weights of from about 650 to about 3000, preferably from about 1000 to about 2000.

The mixtures of low molecular weight and high molecular weight polyols which are insoluble usually contain from about 5 to about 50, preferably from about 9 to about 26 and most preferably from about 16 to about 22 percent by weight of the low molecular weight polyol based upon the combined weight of the polyols.

The solubilizer compounds which are employed in the present invention include those represented by the following formulas I. 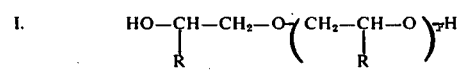

wherein R is methyl or ethyl and x has a value from 1 to about 4 with the proviso that when x is 1, R is ethyl;

II. 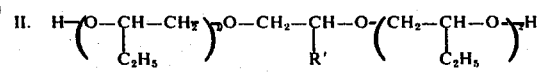

wherein y and z independently have a value from zero to about 2 with the proviso that at least one of y or z must have a value of at least 1.

Suitable such solubilizer compounds include, for example, butylene glycol, dibutylene glycol, tributylene glycol, tetrabutylene glycol, dipropylene glycol, tripropylene glycol, mixtures thereof and the like.

These solubilizer compounds are usually employed in quantities of from about 3 to about 20, preferably from about 3 to about 12, and most preferably from about 6 to about 10 percent by weight based upon the weight of the polyol mixture, the particular quantity employed being dependent upon the polyol mixture and solubilizer employed.

Simple experimentation can be employed to determine the quantity of solubilizer necessary to solubilize a particular polyol mixture. Such experimentation is merely the incremental addition of a desired solubilizer to a particular polyol mixture until solubilization is observed as evidenced by lack of diffraction in a light beam passing through the sample or by the absence of a hazy appearance in the mixture.

The soluble mixtures are prepared by mixing the components by any suitable means such as stirring and the like.

The stabilized compositions of the present invention may also contain catalysts for urethane formation, fire retardant agents, cell control agents, mold release agents and the like if desired.

The following examples are illustrative of the present invention.

EXAMPLES

An incompatible, insoluble polyol mixture was prepared by admixing various high and low molecular weight polyols and then admixing therewith various solubilizer compounds. The incompatible polyol mixtures and the quantity of the indicated solubilizer compound found to solubilize the otherwise insoluble polyol mixture are given in the following table. Unless otherwise indicated, all parts indicated are by weight.

TABLE I

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| HIGH MOLECULAR WEIGHT POLYOL, Type/Parts | A/100 | A/100 | A/100 | A/100 | A/100 | A/100 | A/100 | A/100 |
| LOW MOLECULAR WEIGHT POLYOL, Type/Parts | D/5 C/15 | D/5 C/15 | D/5 C/15 | D/5 C/15 | D/5 C/15 | D/5 C/15 | D/5 C/15 | D/5 C/15 |
| SOLUBILIZER, Type/Parts | A/10 | B/11 | C/11 | D/12 | E/12 | F/9 | G/12 | H/16 |
|  | Ex. 9 | Ex. 10 | Ex. 11 | Ex. 12 | Ex. 13 | Ex. 14 | Ex. 15* | Ex. 16* |
| HIGH MOLECULAR WEIGHT POLYOL, Type/Parts | A/100 | A/100 | A/100 | A/100 | A/100 | A/100 | A/100 | B/100 |
| LOW MOLECULAR WEIGHT POLYOL, Type/Parts | D/5 C/15 | D/5 C/15 | D/5 C/15 | E/12 | E/14 | E/18 | F/5 | F/5 |
| SOLUBILIZER, Type/Parts | I/17 | J/15 | K/15 | F/4 | F/6 | F/12 | F/17 | F/20 |

*This mixture also contained 0.1 parts of lead octoate (24% by weight lead), a catalyst for urethane formation.

POLYOL A is an adduct of glycerine with propylene oxide subsequently end-capped with about 13–15% of ethylene oxide by weight, the resultant polyol having an OH equivalent weight of about 1650.
POLYOL B is an adduct of glycerine with propylene oxide subsequently end-capped with about 10% of ethylene oxide by weight, the resultant polyol having an OH equivalent weight of about 1000.
POLYOL C is monoethylene glycol.
POLYOL D is diethylene glycol.
POLYOL E is 1,4-butanediol.
POLYOL F is glycerine.
SOLUBILIZER A is a mixture of butylene glycols consisting of 7.4% 1,2-butylene glycol, 27.7% tri(1,2-butylene glycol), 3% tetra(1,2-butylene glycol) and 61.9% di(1,2-butylene glycol).
Solubilizer B is an adduct of 1,2-propylene glycol with 1,2-butylene oxide in a mole ratio of about 1 to 2 respectively.
SOLUBILIZER C is an adduct of 1,2-propylene glycol with 1,2-butylene oxide in a mole ratio of about 1 to 1.5 respectively.
SOLUBILIZER D is an adduct of 1,2-propylene glycol with 1,2-butylene oxide in a mole ratio of about 1 to 1 respectively.
SOLUBILIZER E is an adduct of ethylene glycol and 1,2-butylene oxide in a mole ratio of about 1 to 2 respectively.
SOLUBILIZER F is di(1,2-butylene glycol).
SOLUBILIZER G is a mixture of butylene glycols consisting of 15% di(1,2-butylene glycol), 48% tri(1,2-butylene glycol), 28.5% tetra(1,2-butylene glycol) and 8.5% penta(1,2-butylene glycol).
SOLUBILIZER H is 1,2-butylene glycol.
SOLUBILIZER I is a mixture of butylene glycols consisting of 1% di(1,2-butylene glycol), 13% tri(1,2-butylene glycol), 27.6% tetra(1,2-butylene glycol), 32.4% penta(1,2-butylene glycol), 25% hexa-2-butylene glycol) and 1% hepta(1,2-butylene glycol).
SOLUBILIZER J is tri(1,2-propane diol).
SOLUBILIZER K is di(1,2-propane diol).

I claim:
1. A composition resistant to phase separation which comprises:
  A. an insoluble mixture which is susceptible to phase separation which comprises:
    1. from about 95% to about 50% by weight of a relatively high molecular weight polyoxy alkylene polyol wherein the majority of the polyoxyalkylene groups are other than oxyethylene groups and have an average of from about 2 to about 4 OH groups per molecule and an average OH equivalent weight of from about 650 to about 3000 or mixtures thereof, and
    2. from about 5% to about 50% by weight of a relatively low molecular weight polyol selected from the group consisting of ethylene glycol, diethylene glycol, tetraethylene glycol, liquid polyoxyethylene glycols, 1,4-butane diol, glycerine and mixtures thereof; and
  B. as a solubilizer for Component A, a minor but effective quantity of a compound or mixture of compounds represented by the formulas

I. 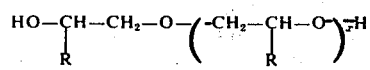

wherein R is methyl or ethyl and $x$ has a value from 0 to about 3 with the proviso that when $x$ is O, R is ethyl;

II. 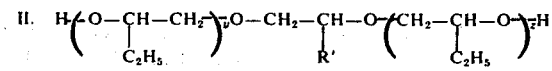

wherein R' is hydrogen or methyl, $y$ and $z$ independently have a value from zero to about 2 with the proviso that at least one of $y$ and $z$ must have a value of at least 1.
2. The composition of Claim 1 wherein Component (A-1) is present in an amount of from about 91% to about 74%; Component (A-2) is present in an amount of from about 9% to about 26% and Component (B) is present in the amount of from about 3 to 20 percent by weight of Component (A).
3. The composition of claim 2 wherein Component (A-1) has an average functionality of from about 3 to about 4 and is present in an amount of from about 84% to about 78%; Component (A-2) is present in an amount of from about 16% to about 22% and Component B is present in an amount of from about 3 to about 12 percent by weight of Component (A).

4. The composition of claim 3 wherein Component (A-1) has an average OH equivalent weight of from about 1000 to about 2000 and Component (B) is present in an amount of from about 6 to about 10 percent by weight of Component A.

5. The composition of claim 4 wherein Component (B) is a member of the group represented by formula I or mixtures thereof.

6. The composition of claim 5 wherein Component (B) is a mixture of poly(1,2-butylene glycols).

7. The composition of claim 5 wherein component (B) is 1,2-butylene glycol or di(1,2-butylene glycol).

8. The composition of claim 5 wherein Component (B) is di(1,2-propylene glycol) or tri(1,2-propylene glycol).

9. The composition of claim 4 wherein Component (B) is a member of the group represented by formula II.

10. The composition of claim 9 wherein R' is hydrogen.

11. The composition of claim 10 wherein the sum of $y$ and $z$ is about 2.

12. The composition of claim 9 wherein R' is methyl.

13. The composition of claim 12 wherein the sum of $y$ and $z$ is from about 1 to about 2.

* * * * *